United States Patent
Pereira Mosqueira et al.

(10) Patent No.: US 10,322,793 B2
(45) Date of Patent: Jun. 18, 2019

(54) LEADING EDGE FOR AN AIRFOIL

(71) Applicant: Airbus Operations S.L., Getafe (ES)

(72) Inventors: Fernando Pereira Mosqueira, Getafe (ES); Jesús Javier Vázquez Castro, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 249 days.

(21) Appl. No.: 15/295,099

(22) Filed: Oct. 17, 2016

(65) Prior Publication Data

US 2017/0106969 A1 Apr. 20, 2017

(30) Foreign Application Priority Data

Oct. 15, 2015 (EP) .................................. 15382507

(51) Int. Cl.
*B64C 3/30* (2006.01)
*B64C 3/26* (2006.01)
*B64C 3/28* (2006.01)
*B64C 3/14* (2006.01)

(52) U.S. Cl.
CPC ................ *B64C 3/30* (2013.01); *B64C 3/26* (2013.01); *B64C 3/28* (2013.01); *B64C 2003/146* (2013.01); *Y02T 50/12* (2013.01)

(58) Field of Classification Search
CPC ....... B64C 2003/146; B64C 3/26; B64C 3/28; B64C 3/30; B64C 1/34; B64C 9/22; B64C 2201/105; B64C 2201/102; B64D 15/166; B64D 15/00; Y02T 50/12
See application file for complete search history.

(56) References Cited

U.S. PATENT DOCUMENTS

| | | | | |
|---|---|---|---|---|
| 2,120,250 A | * | 6/1938 | Houston | B64C 3/46 244/134 A |
| 2,378,528 A | * | 6/1945 | Arsandaux | B64C 3/46 244/134 A |
| 2,384,933 A | * | 9/1945 | Lee | B64C 3/50 244/214 |
| 2,393,635 A | * | 1/1946 | Hubbard | B64D 15/166 244/134 A |
| 2,418,262 A | * | 4/1947 | Hunter | B64D 15/166 244/134 A |
| 2,504,684 A | * | 4/1950 | Harper | B64D 15/166 244/134 A |
| 2,763,448 A | * | 9/1956 | Davie, Jr. | B64C 3/48 244/214 |

(Continued)

FOREIGN PATENT DOCUMENTS

| | | |
|---|---|---|
| FR | 1003096 | 3/1952 |
| WO | 0220350 | 3/2002 |

OTHER PUBLICATIONS

European Search Report, dated Mar. 31, 2016, priority document.

*Primary Examiner* — Medhat Badawi
(74) *Attorney, Agent, or Firm* — Greer, Burns & Crain, Ltd.

(57) ABSTRACT

A leading edge for an airfoil comprising a torsion box, the leading edge comprising a leading plate and a first inflatable element suitable for being filled with air. The leading plate comprises a convex side and a concave side. The first inflatable element is in contact with at least part of the concave side, thus reinforcing the leading plate. An airfoil comprising such a leading edge is also provided.

7 Claims, 2 Drawing Sheets

(56) References Cited

U.S. PATENT DOCUMENTS

| | | | | |
|---|---|---|---|---|
| 2,851,229 A * | 9/1958 | Clark | B64C 3/46 244/134 A |
| 2,912,190 A * | 11/1959 | MacDonough | B64C 3/46 244/134 A |
| 2,934,288 A * | 4/1960 | MacIntyre | B64C 3/46 244/134 R |
| 2,937,826 A * | 5/1960 | Johnson | B64C 3/46 244/219 |
| 3,106,373 A * | 10/1963 | Bain | B64C 1/34 244/117 R |
| 3,623,684 A * | 11/1971 | Kline | B64D 15/166 244/134 A |
| 3,711,039 A * | 1/1973 | James | B64C 3/30 244/214 |
| 4,185,373 A * | 1/1980 | Holland | B64D 33/02 29/423 |
| 4,613,102 A * | 9/1986 | Kageorge | B64D 15/166 244/134 A |
| 4,687,159 A * | 8/1987 | Kageorge | B64D 15/166 244/134 A |
| 4,706,911 A * | 11/1987 | Briscoe | B64D 15/16 244/134 A |
| 4,733,834 A * | 3/1988 | Phillips, II | B64D 15/16 244/134 A |
| 4,747,575 A * | 5/1988 | Putt | B64D 15/166 137/624.14 |
| 4,826,108 A * | 5/1989 | Briscoe | B64D 15/16 244/134 A |
| 4,836,474 A * | 6/1989 | Briscoe | B64D 15/16 244/134 A |
| 4,858,854 A * | 8/1989 | Jacobson | B64C 3/30 244/123.11 |
| 4,961,549 A * | 10/1990 | LaRue | B64D 15/166 244/134 A |
| 5,248,116 A * | 9/1993 | Rauckhorst | B64D 15/166 244/134 A |
| 5,314,145 A * | 5/1994 | Rauckhorst, III | B64D 15/166 244/134 A |
| 5,356,096 A * | 10/1994 | Rauckhorst, III | B64D 15/166 244/134 A |
| 5,681,010 A * | 10/1997 | Jensen | B64C 1/34 244/100 A |
| 6,015,115 A * | 1/2000 | Dorsett | B64C 3/46 244/123.11 |
| 6,443,394 B1 * | 9/2002 | Weisend, Jr. | B64C 3/46 244/134 A |
| 7,628,352 B1 * | 12/2009 | Low | F42B 10/60 244/3.21 |
| 8,042,772 B2 * | 10/2011 | Lutke | B64C 3/46 244/123.11 |
| 8,342,451 B1 * | 1/2013 | Lutke | B64C 1/34 244/123.1 |
| 8,376,279 B2 * | 2/2013 | Parks | B64C 3/56 244/123.11 |
| 8,382,045 B2 * | 2/2013 | Manley | B64C 9/16 244/213 |
| 8,534,610 B1 * | 9/2013 | Pitt | B64C 9/22 244/214 |
| 8,534,611 B1 * | 9/2013 | Pitt | B64C 3/50 244/214 |
| 8,584,984 B2 * | 11/2013 | Parks | B64C 3/56 244/123.11 |
| 8,727,280 B1 * | 5/2014 | Lutke | B64C 3/30 244/123.11 |
| 8,763,959 B2 * | 7/2014 | Shepshelovich | B64C 3/14 244/215 |
| 8,931,739 B1 * | 1/2015 | Lutke | B64C 1/34 244/119 |
| 9,061,752 B2 * | 6/2015 | Nagel | B64C 3/48 |
| 9,297,333 B2 * | 3/2016 | Filter | F02K 1/06 |
| 9,567,064 B2 * | 2/2017 | Schlipf | B64C 9/02 |
| 9,598,167 B2 * | 3/2017 | Grip | B64C 3/28 |
| 2003/0122037 A1 * | 7/2003 | Hyde | B64D 15/166 244/134 A |
| 2006/0060706 A1 * | 3/2006 | Elam | B64C 3/30 244/128 |
| 2009/0206196 A1 * | 8/2009 | Parks | B64C 3/56 244/49 |
| 2013/0068880 A1 * | 3/2013 | Parks | B64C 3/56 244/49 |

* cited by examiner

LEADING EDGE FOR AN AIRFOIL

CROSS-REFERENCES TO RELATED APPLICATIONS

This application claims the benefit of the European patent application No. 15382507.0 filed on Oct. 15, 2015, the entire disclosures of which are incorporated herein by way of reference.

TECHNICAL FIELD OF THE INVENTION

The present invention is related to the field of aircraft parts, in particular to the field of leading edges for airfoils.

BACKGROUND OF THE INVENTION

The leading edge of an airfoil contributes to the aerodynamics and performance thereof. An airfoil may be traditionally divided into a torsion box (the central part of the airfoil, bearing the torsion stress due to the lift forces distribution along the span) and leading and trailing edges.

Leading edges are expected to fulfil both mechanical and weight requirements. They must be able to resist impacts while ensuring the aerodynamic shape, but they may not weigh more than strictly necessary.

The traditional way of achieving such a leading edge is by means of stiffening elements, either ribs, or stringers, or a mix of them, which are arranged to enable the leading edge to resist the aforementioned forces.

SUMMARY OF THE INVENTION

The present invention provides an alternative solution for the aforementioned problem by a leading edge comprising a leading plate with a convex side and a concave side, a first inflatable element suitable for being filled with air, the first inflatable element being in contact with at least part of the concave side, thus reinforcing the leading plate and an airfoil including such a leading edge. All the features described in this specification, including the claims, description and drawings, can be combined in any combination, with the exception of combinations of such mutually exclusive features.

According to a first aspect, the invention provides a leading edge for an airfoil comprising a torsion box, the leading edge comprising a leading plate with a convex side and a concave side,
a first inflatable element suitable for being filled with air,
the first inflatable element being in contact with at least part of the concave side, thus reinforcing the leading plate.

The leading edge of the invention may be installed in any airfoil comprising a torsion box. Torsion boxes usually comprise a front spar, which is nearer the leading edge, and a rear spar, which is farther the leading edge.

As a person skilled in the art would construe, the concave side of the leading plate is the side which is curved in the same way as the interior of a sphere, and the convex side of the leading plate is the side which is curved in the same way as the exterior of a sphere. In other words, the concave side is seen from the curvature center of the surface and the convex side is not seen from this curvature center. In the context of an airfoil comprising a leading edge and a torsion box, as in the present application, the concave side of the leading plate is the side which is seen from the torsion box, and the convex side of the leading plate is the side which is not seen from the torsion box, intended to be faced against the air flow.

This leading edge has the advantage of weighing less that the classical stringer-rib reinforced leading edge, being further able to configure the manner of the reinforcement provided to the leading edge.

Further, due to the difference in materials used compared to the composite reinforcement structures, the cost of this leading edge would be less than the cost of the composite-reinforced leading edge of the state of the art.

Further, this leading edge has the advantage of improving the performance against a bird impact.

In a particular embodiment, the leading edge further comprises an outer coverage, covering the leading plate, suitable for further covering the torsion box.

This leading edge has the advantage of providing a continuous outer surface, which makes it easier for the airflow to remain in a laminar flow, thus reducing the drag around the airfoil.

In another embodiment, the leading edge further comprises
a second inflatable element suitable for being filled with air, the second inflatable element being in contact with at least part of the convex side of the leading plate, and
an outer coverage covering the second inflatable element and the leading plate, suitable for further covering the torsion box.

In a particular embodiment, the first inflatable element comprises at least one string that is attached to two different points of the first inflatable element, thus establishing the maximum distance between such points. The string has a maximum length before breakage, when it is stretched, so that the points of the inflatable element, that would be tending to separate from each other due to the internal pressure in the interior of the inflatable element, are kept in that maximum distance between each other, due to the at least one string. In a particular embodiment, the first inflatable element comprises several strings.

In a particular embodiment, the first inflatable element further comprises an inflation valve suitable for controlling the pressure inside said first inflatable element.

In a particular embodiment, the first inflatable element is made of a material comprising fibers made of aramids, nylon or ultra-high-molecular-weight polyethylene and a matrix.

In a more particular embodiment, the matrix comprises silicone, chlorosulfonated polyethylene or thermoplastic polyurethane.

In a second inventive aspect, the invention also provides an airfoil comprising a leading edge according to the first inventive aspect.

BRIEF DESCRIPTION OF THE DRAWINGS

These and other characteristics and advantages of the invention will become clearly understood in view of the detailed description of the invention which becomes apparent from preferred embodiments of the invention, given just as an example and not being limited thereto, with reference to the drawings.

DETAILED DESCRIPTION OF THE PREFERRED EMBODIMENTS

Once an object of the invention has been outlined, specific non-limitative embodiments are described hereinafter.

Figure 1:
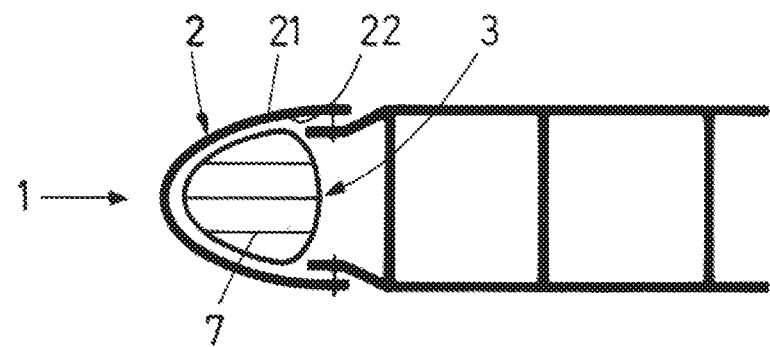
FIG. 1 This figure shows a side view of a first embodiment of a leading edge according to the invention.

FIG. 1 shows a side view of a first embodiment of a leading edge (1) according to the invention. This leading edge (1) comprises:

a leading plate (2) with a convex side (21) and a concave side (22), a first inflatable element (3) suitable for being filled with air, the first inflatable element (3) being in contact with at least part of the concave side (22), thus reinforcing the leading plate (2).

The first inflatable element (3) serves as a structural reinforcement for the leading plate (2). This makes unnecessary the use of stringers or ribs for this purpose, thus saving weight and avoiding inspections of these composite parts.

This leading edge (1) also comprises strings (7). Each one of these strings is attached to two different points of the first inflatable element (3), thus establishing the maximum distance between such points. The arrangement of several strings (7) in the first inflatable element (3) allows the inflatable element (3) to keep a predetermined shape.

Figure 2:
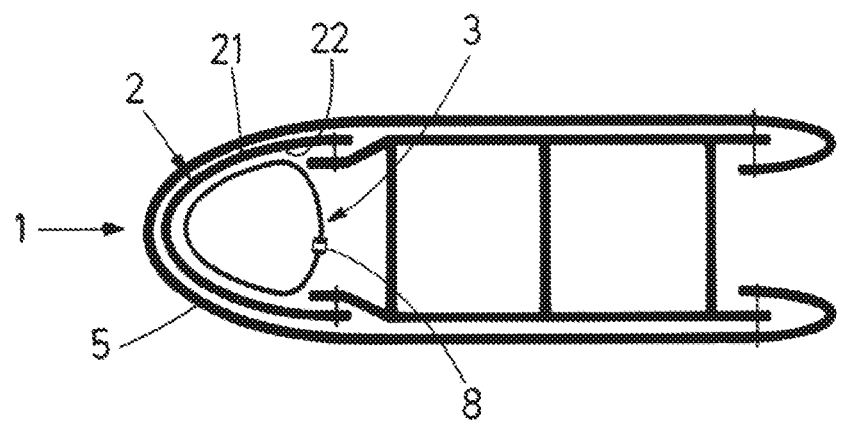
FIG. 2 This figure shows a side view of a second embodiment of a leading edge according to the invention.

FIG. 2 shows a side view of a second embodiment of a leading edge according to the invention. In this embodiment, the leading edge (1) also comprises a leading plate (2) and a first inflatable element (3) as in the embodiment of FIG. 1. In this embodiment, the leading edge (1) further comprises an outer coverage (5) which covers the leading plate (2). This outer coverage (5) is suitable for further covering a torsion box of the airfoil where the leading edge (1) is intended to be installed. In these embodiments, the attachment of the outer coverage to the torsion box is made by attaching one end of the outer coverage to some attaching means located in the rear spar of the torsion box.

This leading edge (1) is suitable for being installed in an airfoil which comprises a torsion box. In this case, this leading edge (1) has the advantage of providing a continuous outer surface, given by the outer coverage (5), which makes it easier for the airflow to remain in a laminar flow, thus reducing the drag around the airfoil where the leading edge (1) is to be installed.

This leading edge (1) further comprises an inflation valve (8) suitable for controlling the pressure inside the first inflatable element (3). This inflation valve (8) is easily accessible for a maintenance check or to modify the pressure of the first inflatable element (3).

Figure 3:
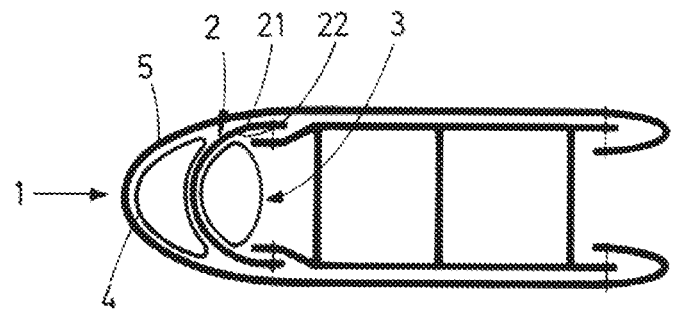
FIG. 3 This figure shows a side view of a third embodiment of a leading edge according to the invention.

FIG. 3 shows a side view of a third embodiment of a leading edge according to the invention. In this embodiment, the leading edge (1) also comprises a leading plate (2) and a first inflatable element (3) as in the embodiment of FIG. 1. In this embodiment, the leading edge (1) further comprises a second inflatable element (4) suitable for being filled with air, the second inflatable element (4) being in contact with at least part of the convex side (21) of the leading plate (2), and an outer coverage (5) covering the second inflatable element (4) and the leading plate (2), suitable for further covering the torsion box.

This embodiment differs from the embodiment of FIG. 2 in that it also comprises a second inflatable element (4) which is arranged between the leading plate (2) and the outer coverage (5).

In different embodiments, both first and second inflatable elements (3, 4) are made of a material comprising fibers made of aramids, nylon or ultra-high-molecular-weight polyethylene and a matrix. In more specific embodiments, the matrix comprises silicone, chlorosulfonated polyethylene or thermoplastic polyurethane.

Figure 4:
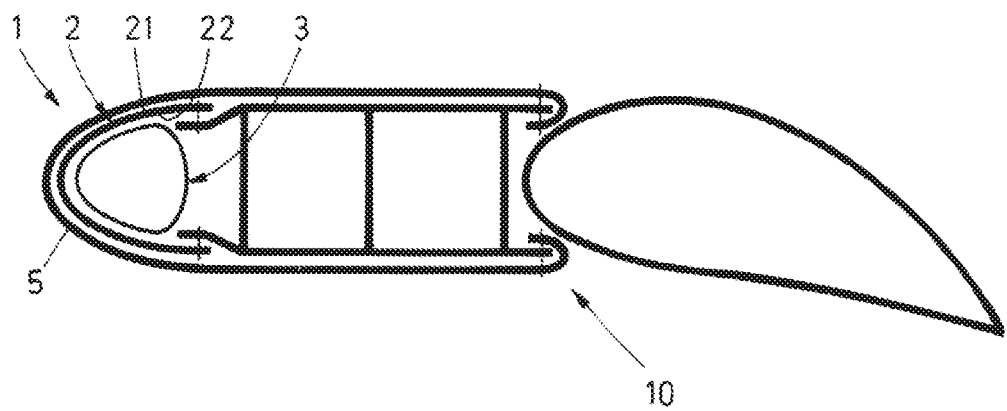
FIG. 4 This figure shows an airfoil comprising a leading edge according to the invention.

FIG. 4 shows an airfoil (10) comprising a leading edge (1) according to any of preceding figures. In this particular figure, the leading edge (1) is configured according to FIG. 2, but an airfoil (10) comprising any other leading edge (1) according to the invention is also part of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A leading edge for an airfoil comprising a torsion box, the leading edge comprising: a leading plate with a convex side and a concave side; a first inflatable element fillable filled with air, the first inflatable contacting at least part of the concave side, thus reinforcing the leading plate, and an outer coverage forming a continuous surface covering the leading plate, configured to further cover the torsion box;

wherein the outer coverage covers upper and lower surfaces of the torsion box and is attached to the torsion box, wherein an attachment of the outer coverage to the torsion box is located at a rear spar of the torsion box opposite a front spar of the torsion box; and wherein the leading plate is attached to the front spar of the torsion box.

2. The leading edge according to claim 1, further comprising: a second inflatable element fillable with air, the second inflatable element contacting at least part of the convex side of the leading plate; and an outer coverage covering the second inflatable element and the leading plate, configured to further cover the torsion box.

3. The leading edge according to claim 1, wherein the first inflatable element comprises at least one string attached to two different points of said first inflatable element, thus establishing a maximum distance between said points.

4. The leading edge according to claim 1, wherein the first inflatable element further comprises an inflation valve configured to control a pressure inside said first inflatable element.

5. The leading edge according to claim 1, wherein the first inflatable element is made of a material comprising fibers made of aramids, nylon or ultra-high-molecular-weight polyethylene and a matrix.

6. The leading edge according to claim 5, wherein the matrix comprises silicone, chlorosulfonated polyethylene or thermoplastic polyurethane.

7. An airfoil comprising: a torsion box and a leading edge, the leading edge comprising: a leading plate with a convex side and a concave side; a first inflatable element fillable with air; the first inflatable element contacting at least part of the concave side, thus reinforcing the leading plate, and an outer coverage forming a continuous surface covering the leading plate, configured to further cover the torsion box;
- wherein the outer coverage covers upper and lower surfaces of the torsion box and is attached to the torsion box, wherein an attachment of the outer coverage to the torsion box is located at a rear spar of the torsion box opposite a front spar of the torsion box; and
- wherein the leading plate is attached to the front spar of the torsion box.

* * * * *